(12) United States Patent
Howell et al.

(10) Patent No.: US 7,925,100 B2
(45) Date of Patent: Apr. 12, 2011

(54) TILED PACKAGING OF VECTOR IMAGE DATA

(75) Inventors: Jonathan R Howell, Seattle, WA (US); Jeremy Elson, Kirkland, WA (US); Danyel Fisher, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 924 days.

(21) Appl. No.: 11/831,057

(22) Filed: Jul. 31, 2007

(65) Prior Publication Data

US 2009/0037441 A1 Feb. 5, 2009

(51) Int. Cl.
*G06K 9/36* (2006.01)
(52) U.S. Cl. ...................................................... 382/232
(58) Field of Classification Search .......... 382/232–233, 382/236, 238–240, 248–251; 345/419–420, 345/422, 424, 428, 552, 582, 614, 619, 620; 701/200–213; 340/995.1–995.28; 708/400–405, 708/203, 300, 307–308, 313, 316–317; 348/394.1–395.1, 400.1–403.1, 407.1, 409.1, 348/413.1, 416.1, 424.1–425.1, 430.1–431.1; 375/240.02–240.03, 240.11–240.12, 240.15–240.16, 375/240.18–240.2; 341/51, 63, 65, 67, 79, 341/107; 705/10, 22, 27
See application file for complete search history.

(56) References Cited

U.S. PATENT DOCUMENTS

| | | | |
|---|---|---|---|
| 5,028,848 A * | 7/1991 | Bankston et al. ............. | 315/364 |
| 5,263,136 A | 11/1993 | DeAguiar et al. | |
| 5,710,835 A | 1/1998 | Bradley | |
| 6,075,535 A | 6/2000 | Fitzhugh et al. | |
| 6,184,888 B1 | 2/2001 | Yuasa et al. | |
| 6,396,503 B1 | 5/2002 | Goss et al. | |
| 6,597,363 B1 * | 7/2003 | Duluk et al. .................. | 345/506 |
| 6,674,445 B1 | 1/2004 | Chithambaram et al. | |
| 7,158,878 B2 | 1/2007 | Rasmussen et al. | |
| 7,206,451 B2 | 4/2007 | Chui et al. | |
| 7,209,148 B2 * | 4/2007 | Rasmussen et al. .......... | 345/613 |
| 7,680,358 B2 * | 3/2010 | Takiyama et al. ............. | 382/282 |
| 2004/0215659 A1 | 10/2004 | Singfield et al. | |
| 2006/0274088 A1 | 12/2006 | Dublin, III et al. | |

FOREIGN PATENT DOCUMENTS

| | | |
|---|---|---|
| JP | 2001119587 A | 4/2001 |
| KR | 1020020085259 A | 11/2002 |
| KR | 1020040025106 A | 3/2004 |

OTHER PUBLICATIONS

Anderson-Lee, et al., "TilePic: a File Format for Tiled Hierarchical Data", JCDL'01, Jun. 24-28, 2001, ACM Press, 2001, pp. 343-344.
Trotts, et al., "Interactive Visualization of Multiresolution Image Stacks in 3D", vol. 35, Issue 3, Apr. 15, 2007, Elsevier, 2007, pp. 1038-1043.
International Search Report, mailed Jan. 15, 2009, 11 pages.

* cited by examiner

*Primary Examiner* — Jose L Couso

(57) ABSTRACT

Architecture for encoding (or packaging) vector-object data using fixed boundary tiles. Tiling a large vector database provides the same advantages that tiling provides for a large raster image. Tiling the dataset means that the set of all possible browser requests is finite and predetermined. The tiles can be rasterized on a client once the tiles have been received from a server. Alternatively, the server can do the tiling and rasterizing, and then send the raster data to the client for presentation and user interaction. Tiles can be precomputed on the server, with selected tiles then transmitted to the client for rasterization. Moreover, tiles can be cached for improved performance, and prefetched based on user interactivity on the client. Summarization of the vector-object data can be accomplished at the server using a configurable plug-in interface.

20 Claims, 17 Drawing Sheets

TILED PACKAGING OF VECTOR IMAGE DATA

BACKGROUND

Contemporary interactive online map services use an optimization to package large map images so that web browsers can fetch just the parts of the image with which the human user is interacting. A single logical image is divided into millions of similarly-sized tiles that fit together seamlessly, and the tiles are small enough that each tile can be fetched rapidly. The browser covers a constant number of tiles so no matter how the view moves over the underlying image, the browser needs only to fetch a constant amount of data to draw the desired view. In other words, the browser software stitches together just enough tiles to show the user the part of the image visible on-screen. As the user scrolls or pans the view left, right, up, or down, the browser software computes exactly which portion of the image is required, and fetches additional tiles to fill in the newly-visible regions of the underlying image.

While this technique is applicable to any large image, it is especially clever for maps. Prior to its introduction, most online maps were drawn using a local projection. As the user scrolled the map, the browser requested that the mapping server draw a new map centered on the new location. By using a projection that was a function of the center of the map, such systems could present minimally-distorted maps, tailored to the specific view. On the other hand, due to the properties of projecting the ellipsoidal Earth into two dimensions, such views could not stitch together into a single continuous view. Consequently, every change in perspective by the user demanded a new rendering at the server. This imposes a high run-time cost on the server, limited by how elaborate server rendering can be, and the high round-trip latency provided a less-interactive experience to the user.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture includes a system for encoding (or packaging) vector-object data using fixed boundary tiles. Tiling a large vector database provides the same advantages that tiling provides for a large raster image. Tiling the dataset means that the set of all possible browser requests is finite and predetermined. Therefore, the tiles can be precomputed. However, even if computed dynamically, the tiles are amenable to effective caching at the server, in the network, and/or at the client. The client can smoothly update its view, prefetching additional tile requests to ensure that additional vector data is available by the time the data is needed, as the view is scrolled.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
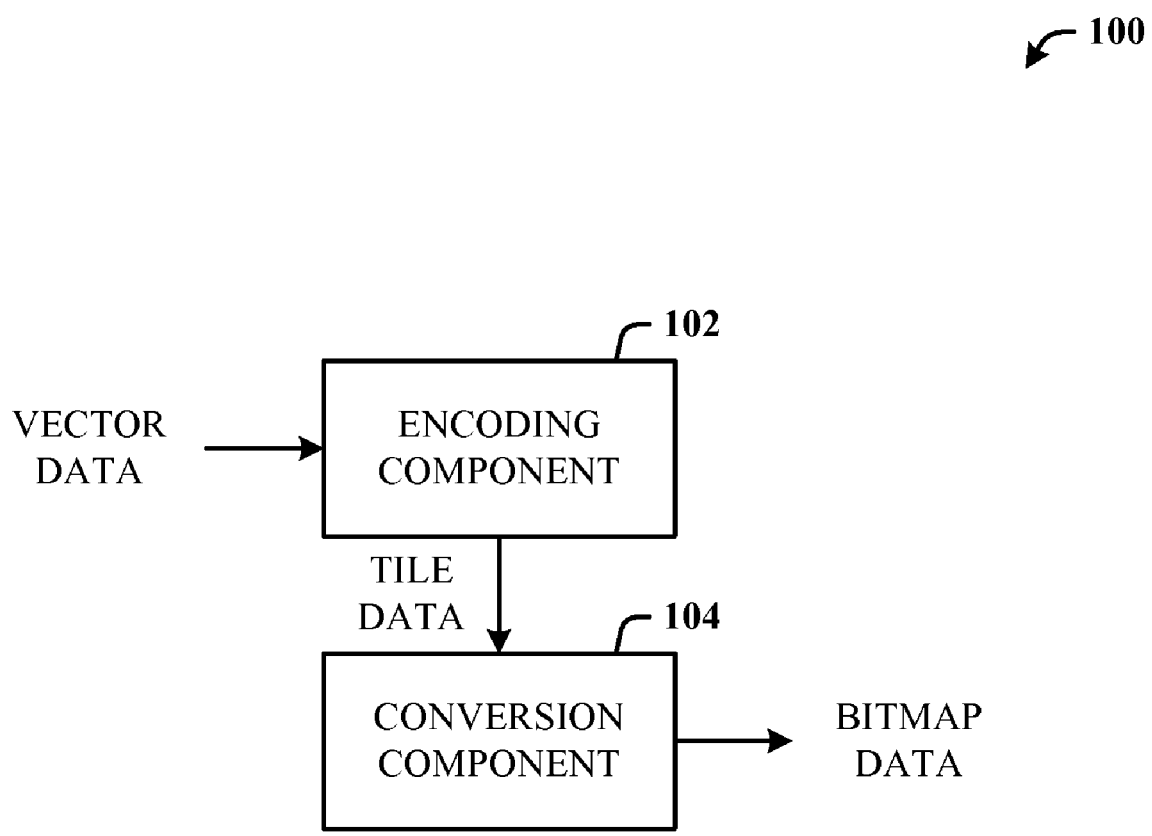
FIG. 1 illustrates a computer-implemented image handling system.

The disclosed architecture is a tile-based approach to online map services that packages vector-object data into tiles. In the tile-based approach, the user can pan the display by a few pixels at a time, and a browser can update the view instantaneously (without interacting with the server), prefetching boundary tiles in the background to ensure a continuous experience. Thus, by enforcing a single common projection, the system can be cast as a view of a single large image, and the tiling technique exploited.

To enable a multi-scale user interface, the tiling approach is conventionally deployed at multiple resolutions. At the maximum resolution ("layer n"), the logical image can be enormous (e.g., perhaps terapixels in area). At the next-lowest resolution ("layer n-1"), every tile covers the geographic extent of four tiles from layer n. Because the tile has the same pixel resolution as any tile, it shows a summarized version of the high-resolution map. Layer n-1 summarizes the data from layer n. For some types of data, such as aerial photography, the data may simply be down-sampled. In other cases, more complex and domain-specific summarization algorithms can be used. For example, summarization of maps with labels typically requires different resolutions to pick a different subset of labels to display (e.g., so individual street names are not displayed in a map that shows an entire state).

This process recurses layer after layer, to layer 0, in which a single tile represents the entire original image, summarized to fit in the pixel budget allocated to the tile. Summarization is ensures that the browser always has a constant amount of information to download and display, even when its view shows a large geographic extent.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented image handling system 100. The system 100 packages vector data into tiles. Tiling a large vector database provides the same advantages that tiling provides for a large raster image. Tiling the dataset means that the set of all possible browser requests is finite and predetermined. Therefore, the tiles can be precomputed. Alternatively, if computed dynamically, the tiles are amenable to effective caching at the server, in the network, and/or at the client. The client can smoothly update its view, prefetching additional tile requests to ensure that additional vector data is available by the time it is needed as the view is scrolled. In support thereof, the system 100 includes an encoding component 102 for encoding vector data of a vector datastore into tile data, and a conversion component 104 for rasterizing the tile data into bitmap data.

The system 100 serves an application that has a very large database of points and lines (e.g., phone book information) which may be too large to efficiently transmit the entire database to a client, wants to transmit that data in a high-level format along with associated metadata to the client (not just a bitmap rendering of one aspect of the data), and/or wants to serve requests quickly (or using a simple server) by using the tiling technique already developed for bitmaps.

Figure 2:
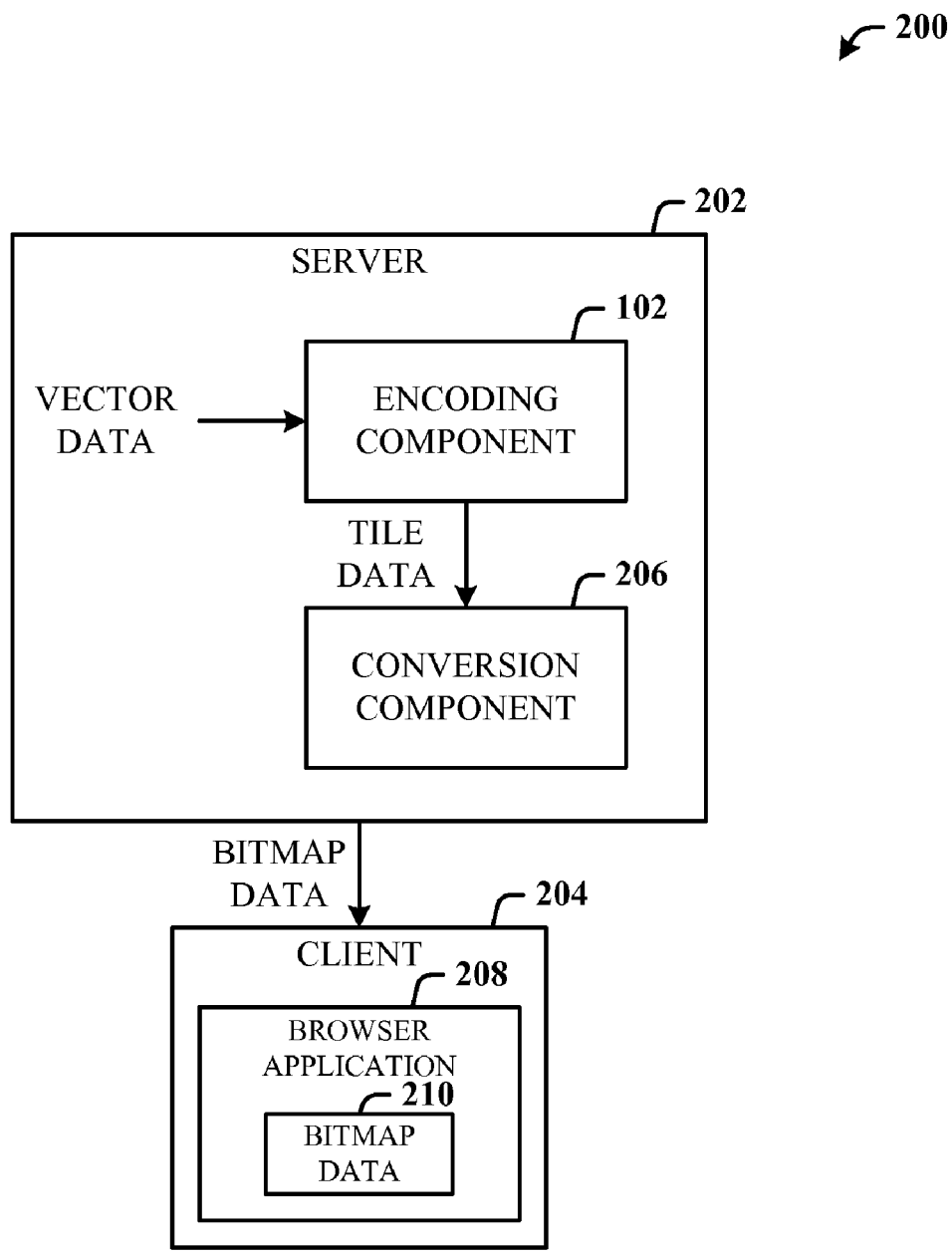
FIG. 2 illustrates an exemplary system where a server provides the rasterized data to a client for presentation and user interaction.

FIG. 2 illustrates an exemplary system 200 where a server 202 provides the rasterized data (e.g., bitmap data) to a client 204 for presentation and user interaction. In this embodiment one or more servers store the vector data (e.g., geographic information). Here, the encoding component 102 partitions the vector data into tiles (tile data). The tiles are then passed to a conversion component 206 (a server-side version of conversion component 104) for rasterization into the bitmap data, which bitmap data is then transmitted to the client 204 for presentation. One embodiment employs a client browser application 208 as the application via which bitmap data 210 is presented and via which a user interacts.

Figure 3:
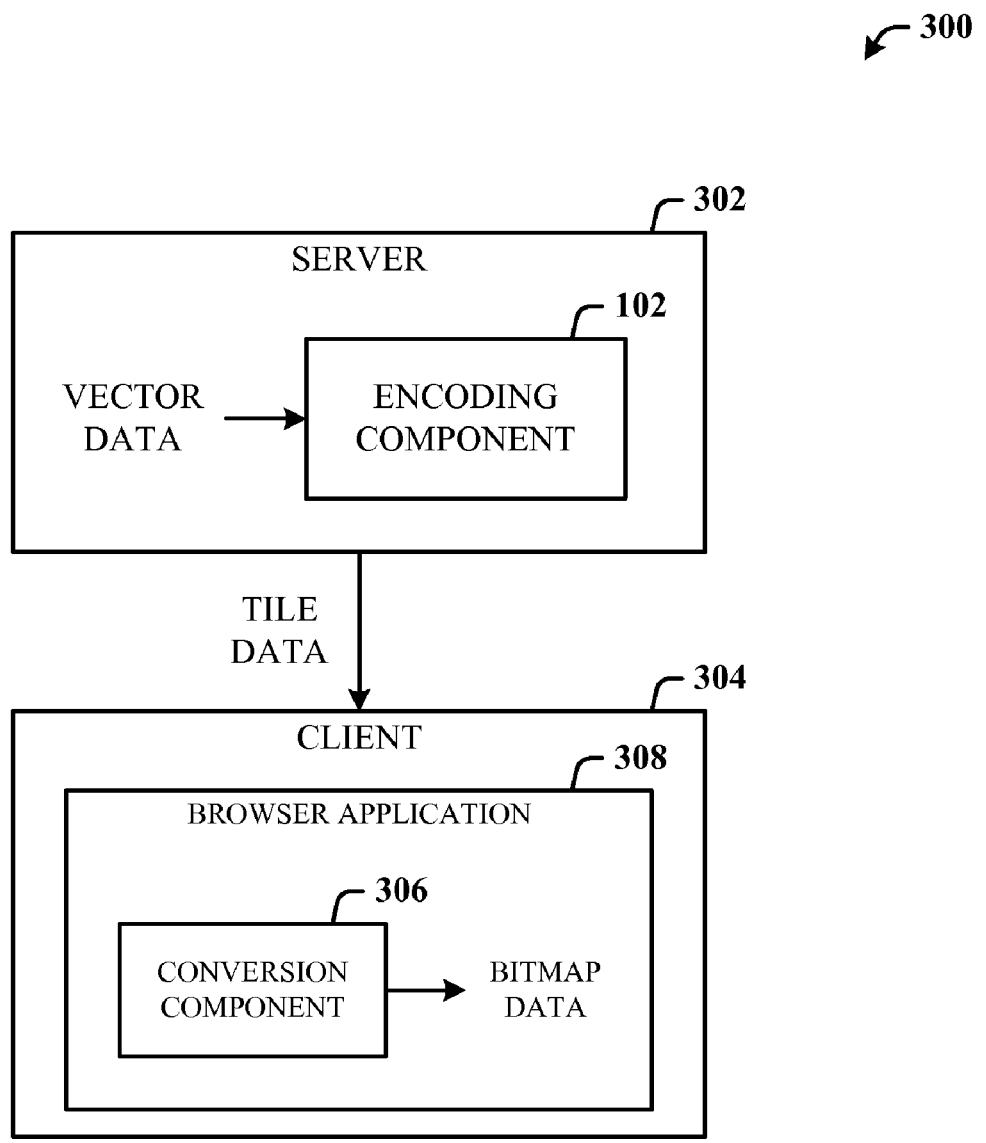
FIG. 3 illustrates an alternative system for vector image processing.

FIG. 3 illustrates an alternative system 300 for vector image processing. Here, a server 302 hosts the encoding component 102 for partitioning the vector-object data into tile data. The server 302 then transmits the tile data to a client 304. The client 304 includes a conversion component 306 (a client-side version of conversion component 104) for rasterizing the tile data into bitmap data. The conversion component 306 is illustrated as part of a browser application 308. Thus, when the user interacts with the vector data (image) via the browser 308, the tile data, already precomputed at the server 302, is downloaded to the client browser 308 for conversion and presentation as the bitmap data.

Much of the benefit of using tiles with raster data comes from using standardized tile boundaries. The standard boundaries ensure that requests for data in a particular geographic region will produce the same set of specific requests, making the requests precomputable and cacheable. Furthermore, because the tiles partition an image in a standard projection (or coordinate system), data from many different network sources can be fetched using a single view-to-tile mapping scheme and then overlaid to present a single view of the standard projection.

For map data of most of the world, one embodiment utilizes tiles in which the lowest-resolution tile is a square representing the standard Mercator projection, that is, minus 85 degrees to plus 85 degrees latitude. A Mercator projection is a projection of the Earth (or spherical body) onto a cylinder. With each increase in the zoom level, for example, each tile is then divided into four equal subtiles.

Other map applications can use other projections, for example, to enable coverage of high-latitude regions. Other non-map applications can use other tilings of the data, to agree with the tiling scheme of related raster data, for example.

Figure 4:
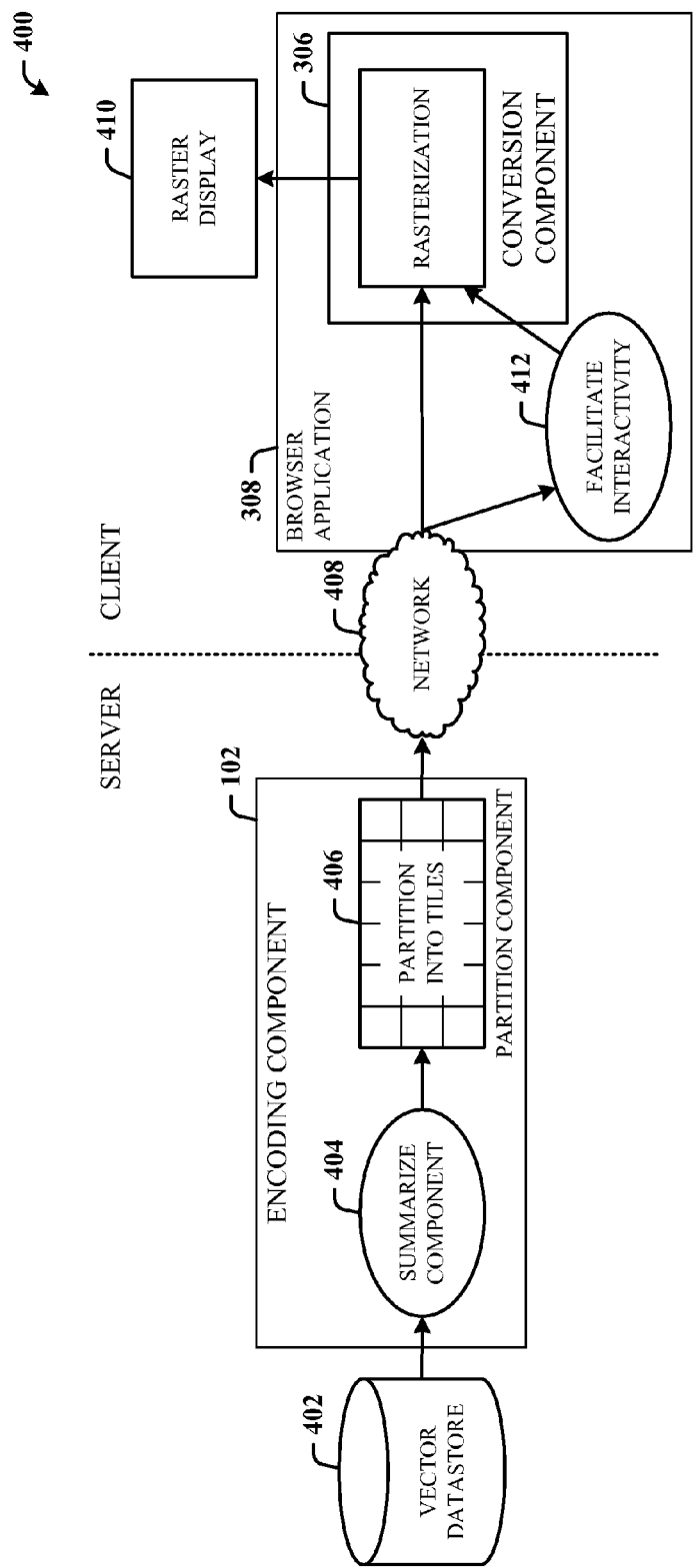
FIG. 4 illustrates a more detailed system where tiles are passed to the client for rasterization.

FIG. 4 illustrates a more detailed system 400 where tiles are passed to the client for rasterization. The system 400 includes a server-side vector datastore 402 for map images, for example. A summarize component 404 (as part of the encoding component 102) summarizes data based on the data type. A partition component 406 (as part of the encoding component 102) partitions the vector-object data into tiles of a predetermined size (e.g., Mercator projections). The tiles are transmitted to the client over a network 408 (e.g., wire, wireless) to the client-side conversion component 306. The conversion component 306 performs rasterization of the tiles (on the client) into bitmap data which can then be presented using a raster display system 410. When embodied as part of an application (e.g., the browser 308), user interactivity 412 can be facilitated. In other words, the user can select functions via the browser 308 that zoom in or out on the bitmap data, which can cause further vector data retrieval (already in tiles) from the server datastore 402, and then rasterization into the new view desired by the user.

Figure 5:
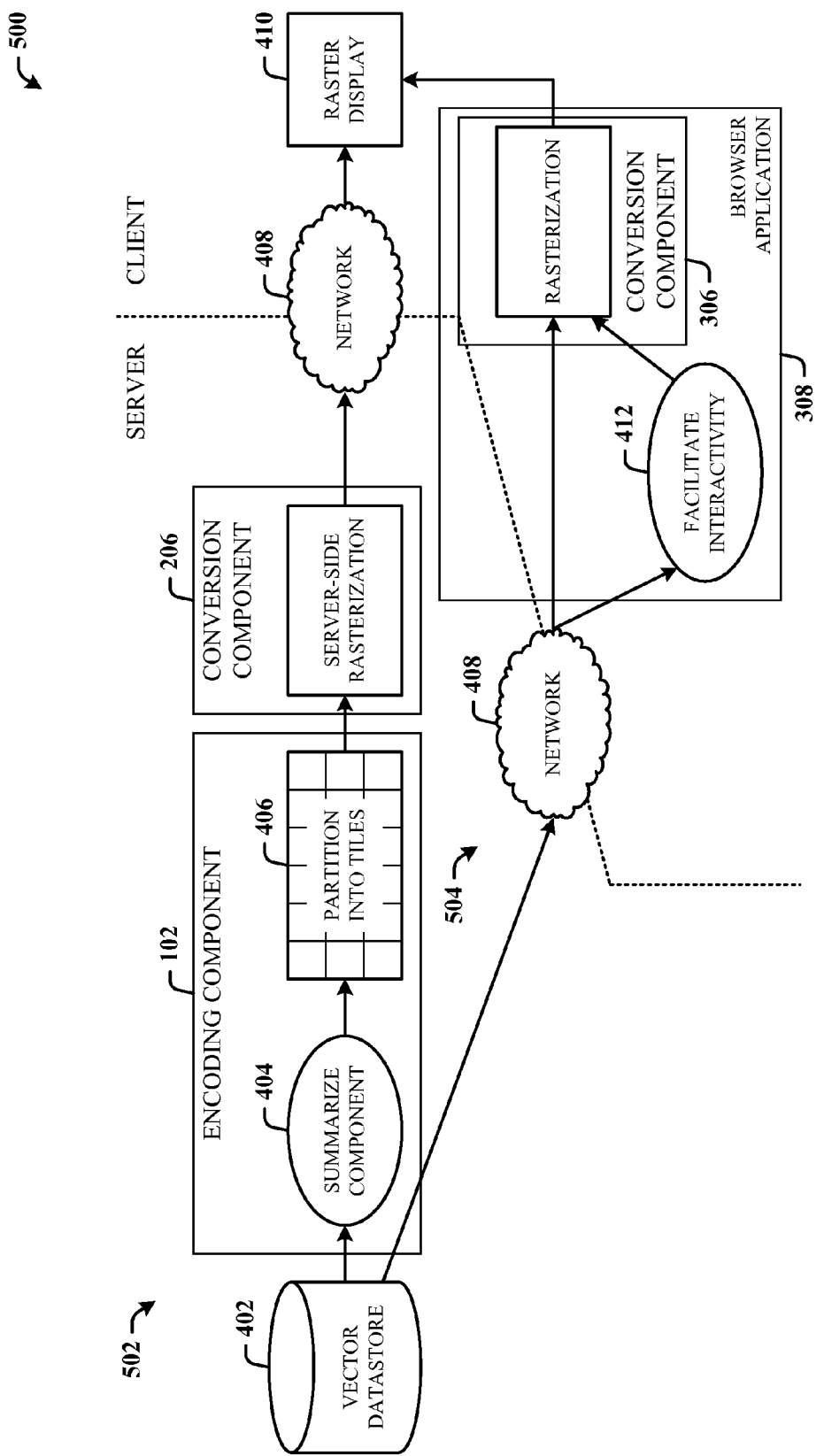
FIG. 5 illustrates an alternative detailed system where tiles are rasterized on the server and the bitmap data is then passed to the client.

FIG. 5 illustrates an alternative detailed system 500 where tiles are rasterized on the server and the bitmap data is then passed to the client. The system 500 includes two paths (an upper path 502 and a lower path 504) for processing vector data. The upper path 502 can be traversed when large volumes of vector data are required. The lower path 504 can be traversed when small volumes of vector data are needed. In this latter case, the entire vector database 402 can be transmitted to the client such that the client performs rasterization of the vector data directly, obviating the need for tiles. However, it is to be understood, that the client could also perform tiling prior to rasterization of the received vector data.

More specifically, the upper path 502 of the system 500 retrieves the vector-object data from the server-side vector datastore 402, and summarizes the data using the summarize component 404 (as part of the server-side encoding component 102) based on the data type. The partition component 406 (as part of the server-side encoding component 102) partitions the vector-object data into tiles of a predetermined size (e.g., Mercator projections). The tiles are passed to a server-side rasterization process (as part of the server-side conversion component 206) for conversion into the bitmap data, which data is then transmitted to the client over the network 408 (e.g., wire, wireless) for presentation on the raster display 410. It is to be understood however, that the bitmap data from the conversion component 206 can be processed through the browser application 308 for presentation by the raster display, thereby facilitating user interactivity 412 (e.g., zoom, pan, etc.).

As previously indicated, when the volume of data is small, the data is retrieved via the lower path 504 over the network 408 to the browser application 308. The vector data can then be passed directly to the client-side conversion component 306 for rasterization into bitmap data, and then to the raster display 410.

Figure 6:
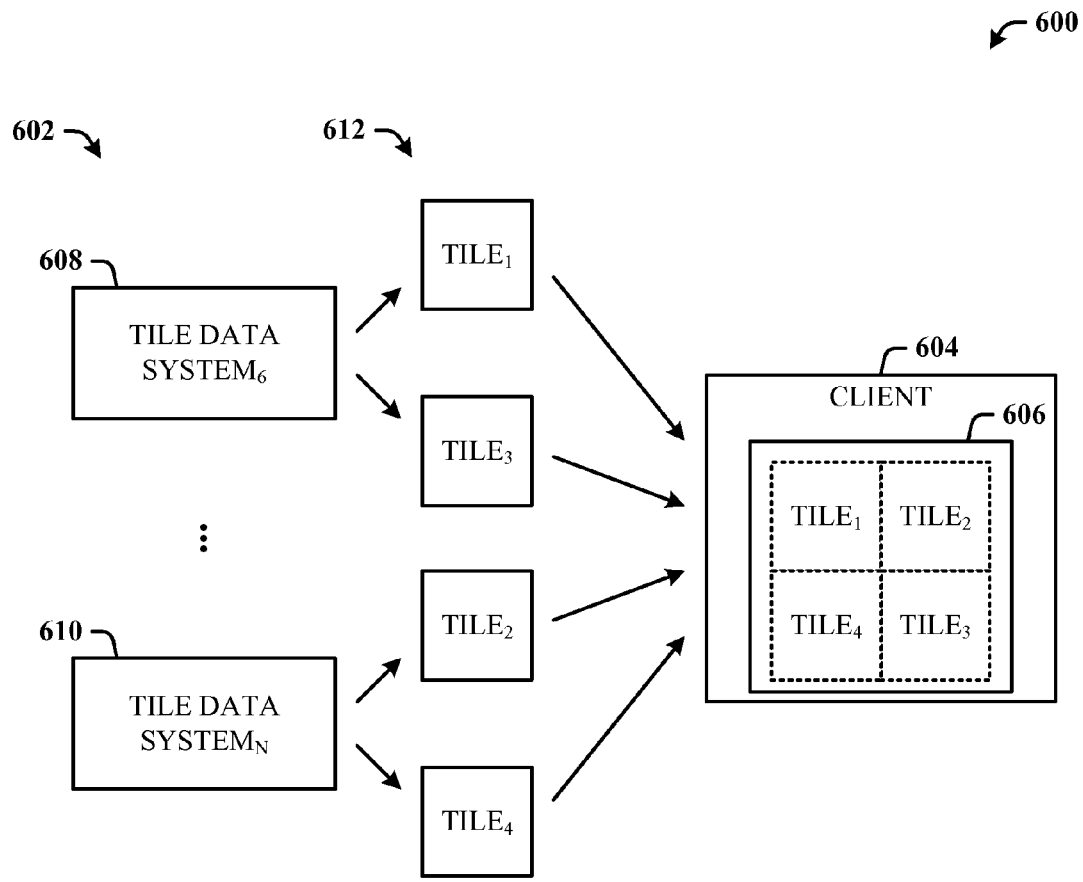
FIG. 6 illustrates a distributed system for receiving tile data from different server systems.

FIG. 6 illustrates a distributed system 600 for receiving tile data from different server systems. The system 600 includes multiple server systems 602 (denoted TILE DATA SYSTEM$_1$, . . . ,TILE DATA SYSTEM$_N$, where N is a positive integer) each of which include a vector datastore (not shown). A client 604 has requested an image 606 which can be processed against two server systems: a first system 608 and a second server system 610. The servers (608 and 610) determine that the image 606 requires four tiles 612: TILE$_1$, TILE$_2$, TILE$_3$ and TILE$_4$. Here, the first server 608 sends tiles TILE$_1$ and TILE$_3$, while the second server 610 sends tiles TILE$_2$ and TILE$_4$. The client 604 then rasterizes the tiles (indicated by the dotted tile boundaries) into the image 606 for presentation.

Figure 7:
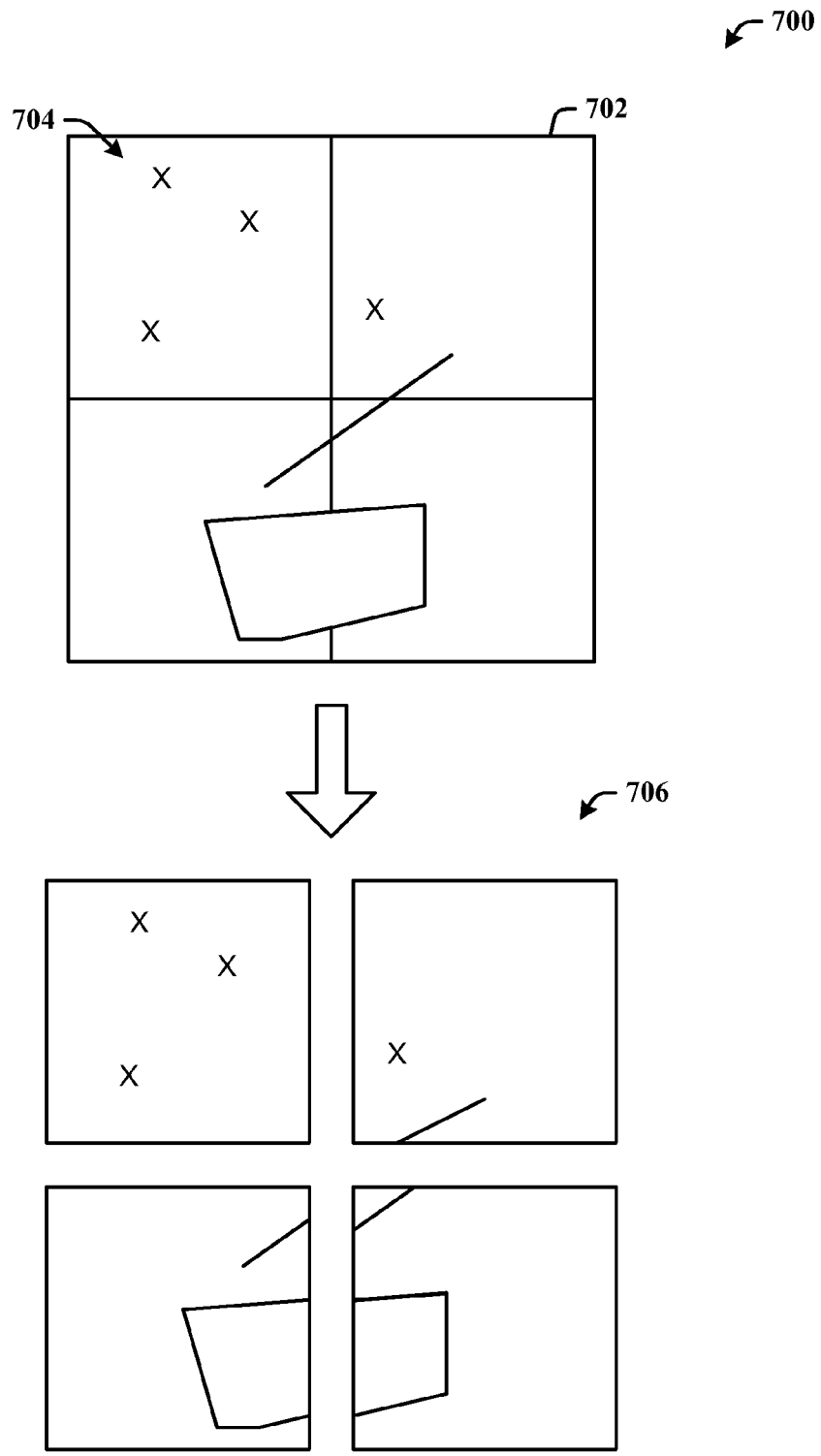
FIG. 7 illustrates an exemplary method of partitioning vector data.
Figure 8:
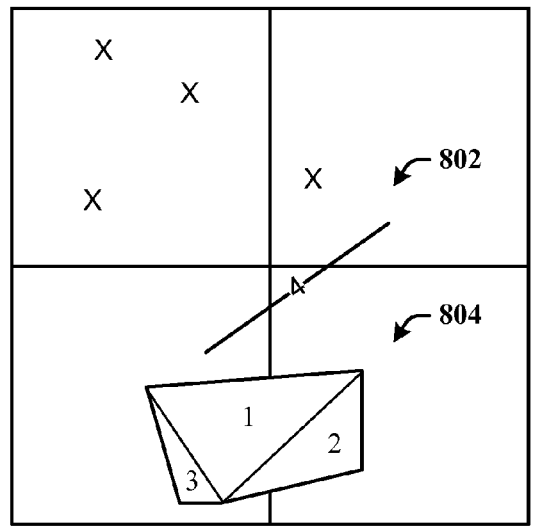
FIG. 8 illustrates a partitioning optimization.
Figure 8:
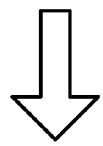
Figure 8:
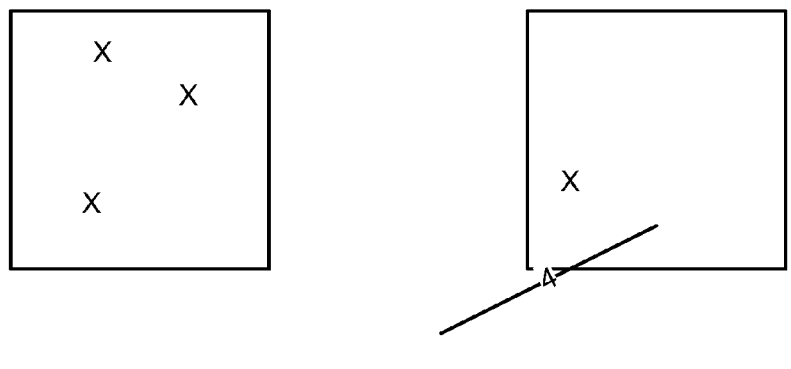
Figure 8:
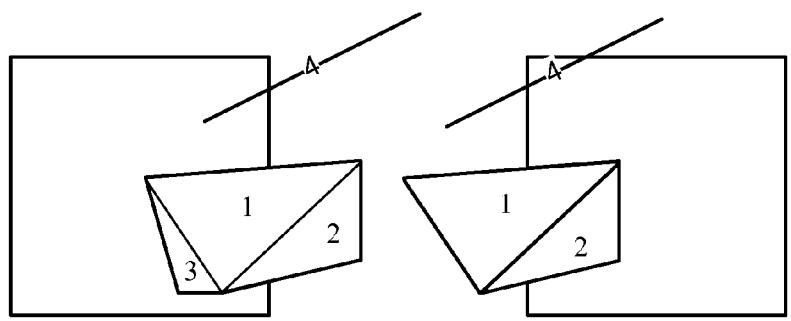

FIGS. 7 and 8 illustrate methods of partitioning vector data. FIG. 7 illustrates an exemplary method 700 of partitioning vector data. A set of point data can be trivially partitioned into tiles. A vector object 702 with extent, including segmented lines, segmented curves, and polygons, can be partitioned. Each vector object with extent is intersected with tile boundaries so that each tile contains only vector data that belongs within the object extent. Here, the vector object data 704 includes four points (denoted as "X's"), a line and a polygon. The method is as follows: for each tile that the object intersects, compute the intersection of the tile boundary with the object, and include the intersection object in the tile's object list. The tiled vector data 706 includes four tiles partitioned according to the method.

FIG. 8 illustrates a partitioning optimization 800. As an optimization to enable more efficient client-side processing, the system can perform less restrictive intersections. For example, if a line segment 802 traverses several tiles, the entire original segment, identified by a unique identifier, can be included in each tile's object list. In this example, the approach has "no cost" because the line segment 802 takes the same amount of storage regardless of whether the line segment is intersected with the tile boundary. The advantage is that the client can use the object's unique identifier to discover that the instances of the object in neighboring tiles are identical, and thus, must only render the object once, rather than once per tile. Here, simple objects are allowed to extend past tile boundaries so that the client can identify the three copies of the line segment 802 as a single object and only represent the segment once. Complex objects are broken into simple objects before applying the optimization.

To generalize this optimization to polygons, the system breaks a polygon 804 into compact triangles (triangles with large area to perimeter ratios) and associates the triangles with the tiles it intersects. This generalization is advantageous because arbitrary polygons can have an unbounded number of vertices; by breaking polygons into constant-size triangles, the previous "no-cost" description now applies.

As a general principle, potentially-complex objects (those with non-constant size) should be broken into constant-size components of local extent before tiling. Objects whose descriptions do not have constant local summaries will not benefit from tiling. For a contrived example, a complex polygon whose color at any interior point is determined by the sum of distances from all other vertices has no locally-constant description.

FIGS. 9-14 illustrate summarization of the vector data. Just as raster tiles are stacked into multiple-resolution layers, tiles of vector objects should be stacked to provide summary views of large geographic extent. In raster layers, each tile is given a constant pixel budget (e.g., 256×256 pixels), or perhaps even a constant byte budget (e.g., 10 KB, providing a bound on the quality of the compressed tile image). The constant budget ensures that each tile contains a constant amount of content, and hence, each view (composed of a constant number of tiles) requires accessing and displaying a constant amount of content. Similarly, for tiles of vector objects, a target budget can be established, measured in count of objects, count of bytes of object representation, or both. Each tile summarizes the data from the four tiles in the next-lower layer as needed to stay within its budget.

Figure 9:
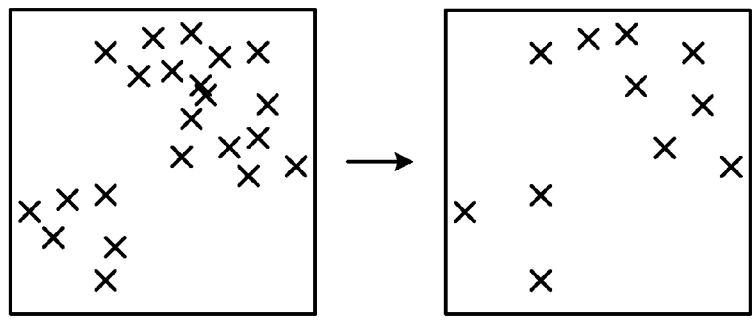
FIG. 9 illustrates a summarization method of discarding unimportant objects.

With raster data, the technique for summarization is to downsample the image data. For vector objects, a number of well-known techniques that can be applied depending on the data. For example, point data can be summarized by discarding points, either randomly or based on an importance or relevance value associated with the data set. FIG. 9 illustrates a summarization method 900 of discarding unimportant objects.

Figure 10:
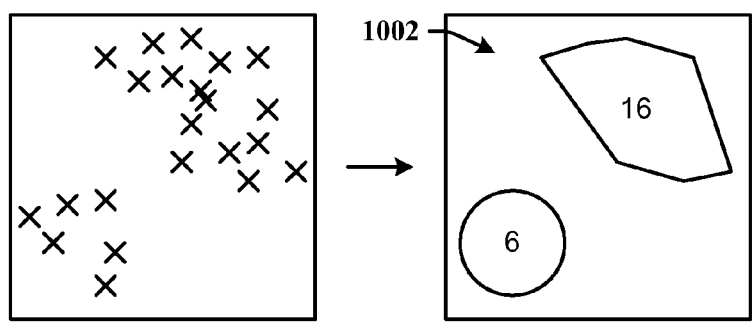
FIG. 10 illustrates a method for summarizing sets of points by area.

FIG. 10 illustrates a method 1000 for summarizing sets of points by area. Alternatively, a large group of points in a dense region can be summarized by a polygon 1002 representing the area of the points (e.g., labeled with the number of points inside). Such polygons 1002 can be further summarized using techniques appropriate for general polygons. Additionally, groups of point-summary polygons can be summarized by a single polygon representing the area of all of the points represented by the original group.

Figure 11:
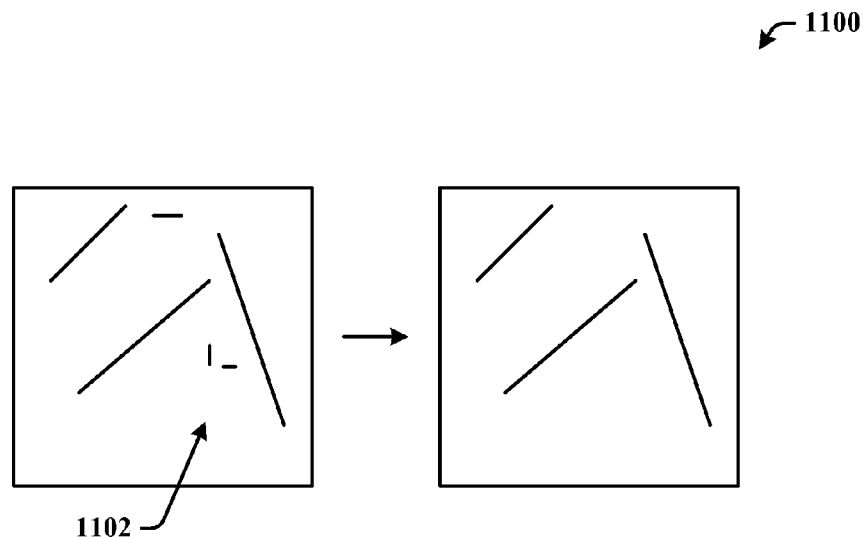
FIG. 11 illustrates a method for summarizing line and curve data.

FIG. 11 illustrates a method 1100 for summarizing line and curve data. Line and curve data similarly can be summarized by discarding unimportant objects 1102. Where such labels are not available, short objects 1102 can be discarded.

Figure 12:
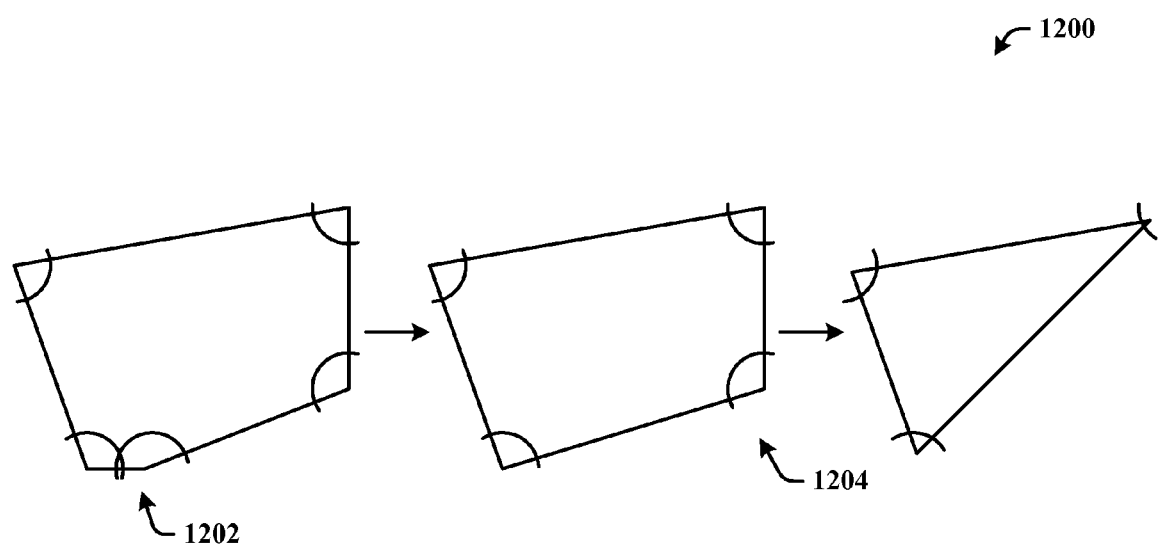
FIG. 12 illustrates a method for summarizing polygons and compound curves.

FIG. 12 illustrates a method 1200 for summarizing polygons and compound curves. Polygons or compound curves can be summarized by discarding vertices that least affect the overall shape of the object. For example, consider each vertex to be the apex of an angle formed by the edges neighboring the vertex. Then discard those vertices (1202 and 1204) that form the largest (most obtuse) angles. Large sets of polygons can be summarized by discarding entire polygons with small area (analogous to FIG. 11).

Ideally, the tile budget is large enough that no feature must be discarded until it is so small that its absence would not be missed in the summarized view. However, the bandwidth and client performance of the application can enforce a tight budget, and the vector data set may well contain more objects than can be summarized in that budget, requiring that some objects or object features be discarded, as described above.

Figure 13:
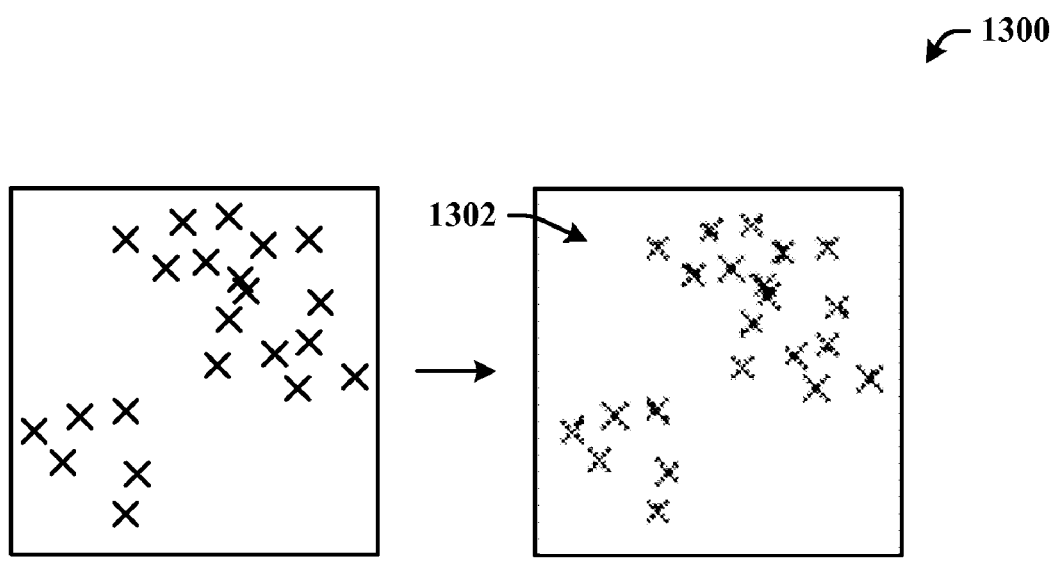
FIG. 13 illustrates a raster tile that contains a rendered image of discarded objects.

Discarding objects or object features may be undesirable if the discard changes the appearance of the overall data too dramatically. In that case, an alternative approach is to introduce an additional raster tile with the summary that contains a rendered image of the discarded objects. This way, the most important objects are still represented on the client as distinct objects, but the fine details are still drawn (at the maximum resolution of the summary layer). FIG. 13 illustrates a raster tile that contains a rendered image of discarded objects. This approach preserves the constant-budget-per-tile property, since each tile still contains at most a constant amount of vector data plus a constant-sized raster image.

Because the rasterized objects no longer have unique identities, it may be difficult or impossible to provide interactivity on the client side for objects so summarized; however, this limitation is mitigated by two facts: first, the rasterized views are "better than nothing:" the user can still see the features and zoom in to reach a summary level at which the features are represented as vector objects (and thus retain their interactivity); alternatively, if the user attempts an interactive operation on a part of the display with no vector objects, the client can handle the particular request either by directly requesting the sub-tile containing the request (e.g., mouse-click location) to discover the appropriate vector object, or by forwarding the request to the server.

For each type of data, there can be different ways to summarize the data. Accordingly, summarization can be realized as a self-contained system, taking raw vector data as input and emitting summarized tiles of vector data. The system can then be provided with a summarization configuration that indicates how to summarize each type of data and at each level of detail. Indeed, while there may be a library of common techniques; in general, an embodiment of the system should support executable-code plug-ins that provide an expressive mechanism for summarizing data types. Following are examples of a variety of types of summarization: a simple sum summarizes the number of parking spaces in a region or items available in auctions; arithmetic mean summarizes temperature readings: minimum and maximum summarize gas prices; a bounding box summarizes the extent of observations of an environmental contaminant; vector downsampling summarizes the points defining an intricate route; and, string formatting summarizes other operators, for example, "cheapest gas $2.98; average gas $3.05". Note that the variety of summarization techniques is so general that a plug-in interface, rather than a small, non-extensible library of options, can be employed.

Figure 14:
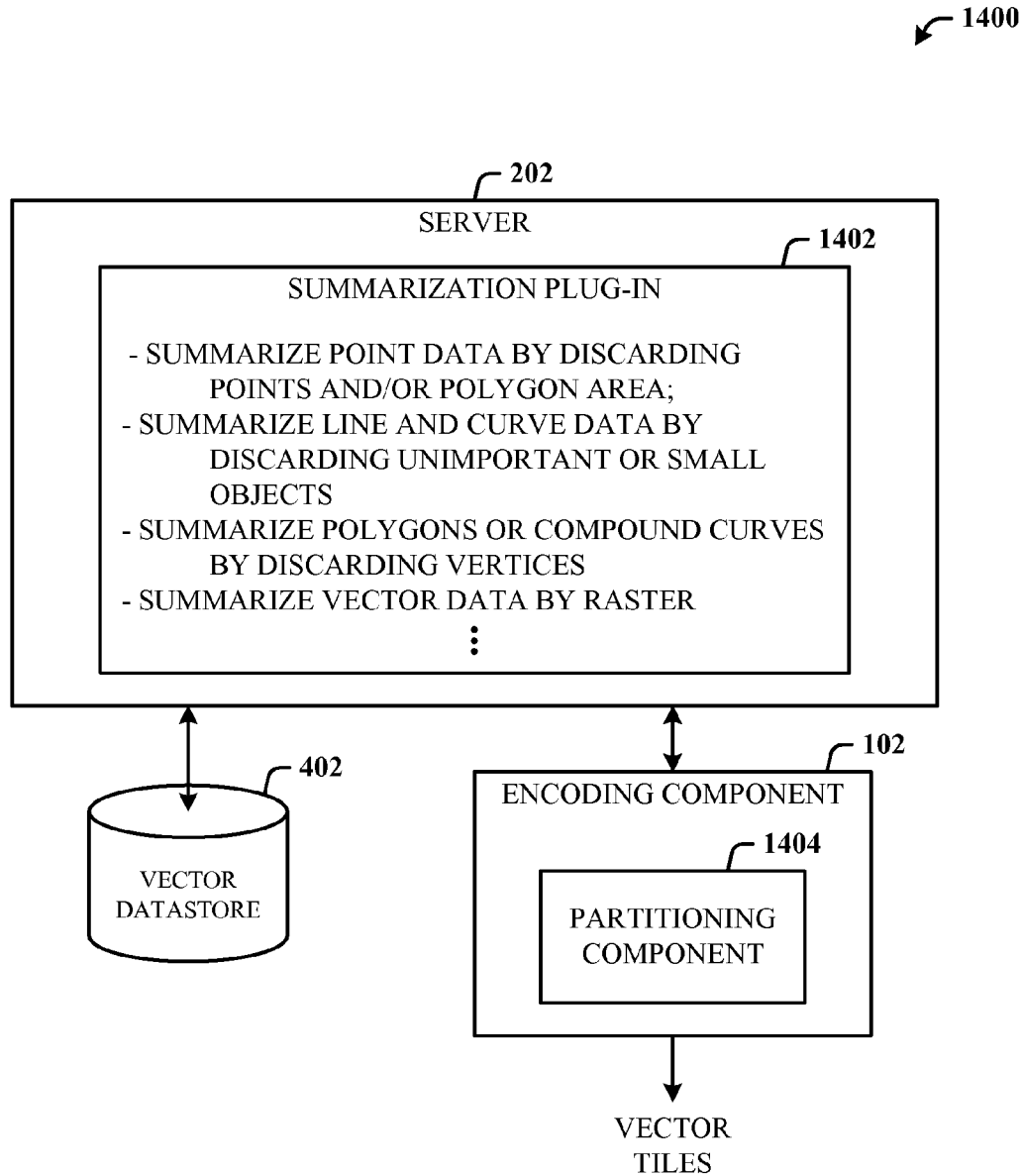
FIG. 14 illustrates summarization and partitioning of vector data into vector tiles.

FIG. 14 illustrates a system 1400 for summarization and partitioning of vector data into vector tiles. The server 202 includes a summarization plug-in 1402 for summarizing the vector-object data of the vector datastore 402. Once summarized, the output can be passed to the encoding component 102 where a partitioning component 1404 partitions (or tiles) the summarized data into vector tiles. The vector tiles can then be transmitted to the client for rasterization and presentation. The plug-in 1402 can perform summarization in a number of ways, depending on the data type: for point data, by discarding points and/or polygon area; for lines and curves, by discarding unimportant or small objects; for polygons or compound curves, by discarding vertices; for vector data, by rasterization, and so on. Note that, here, the encoding component 102 is depicted as external to the server 202, as an alternative implementation to FIG. 2.

Figure 15:
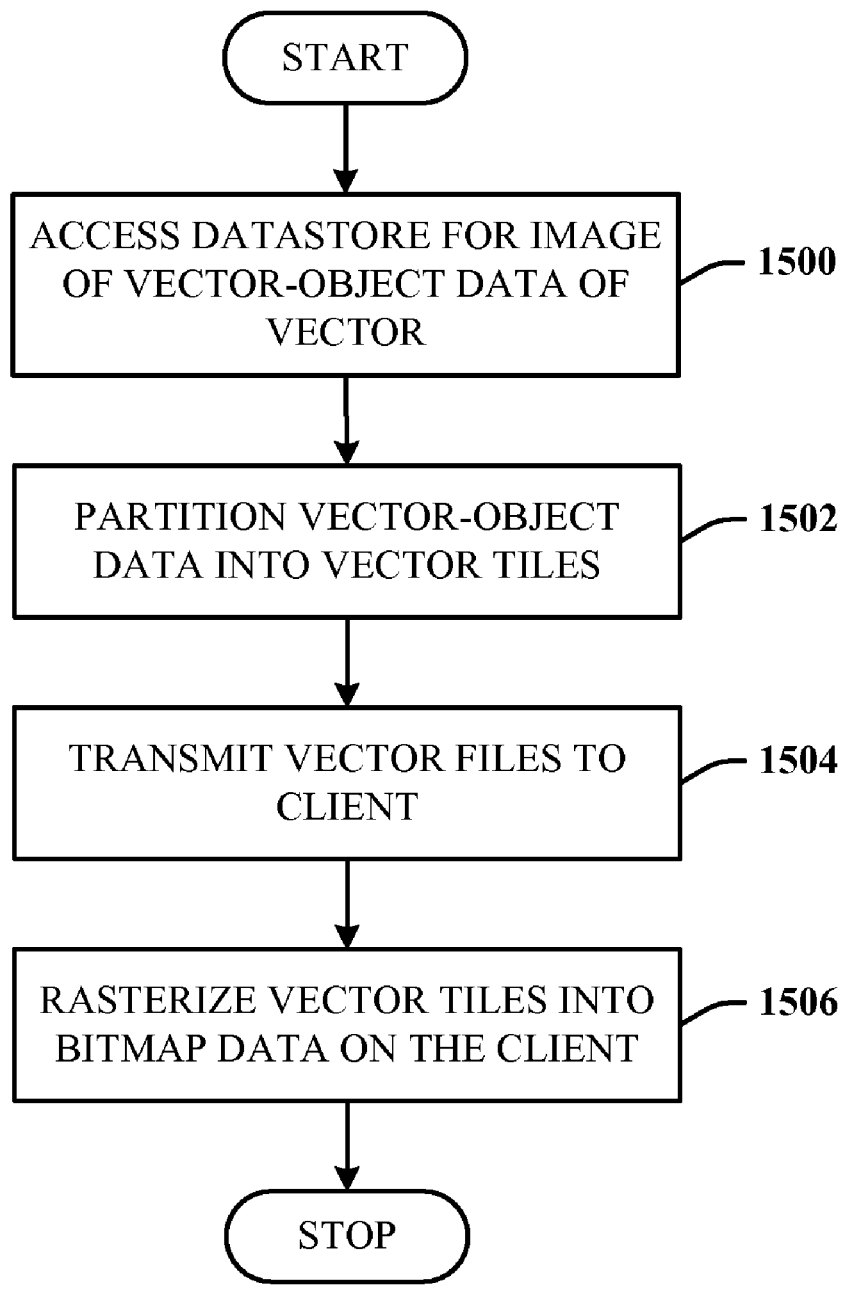
FIG. 15 illustrates a method of handling image data in accordance with the disclosed architecture.

FIG. 15 illustrates a method of handling image data in accordance with the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 1500, a datastore is accessed for an image in the form of vector-object data. At 1502, the vector-object data is partitioned into vector tiles. At 1504, the vector tiles are transmitted to client. At 1506, the vector tiles are rasterized into bitmap data on the client. The bitmap data can then be present on the client via a browser application and interacted with.

Figure 16:
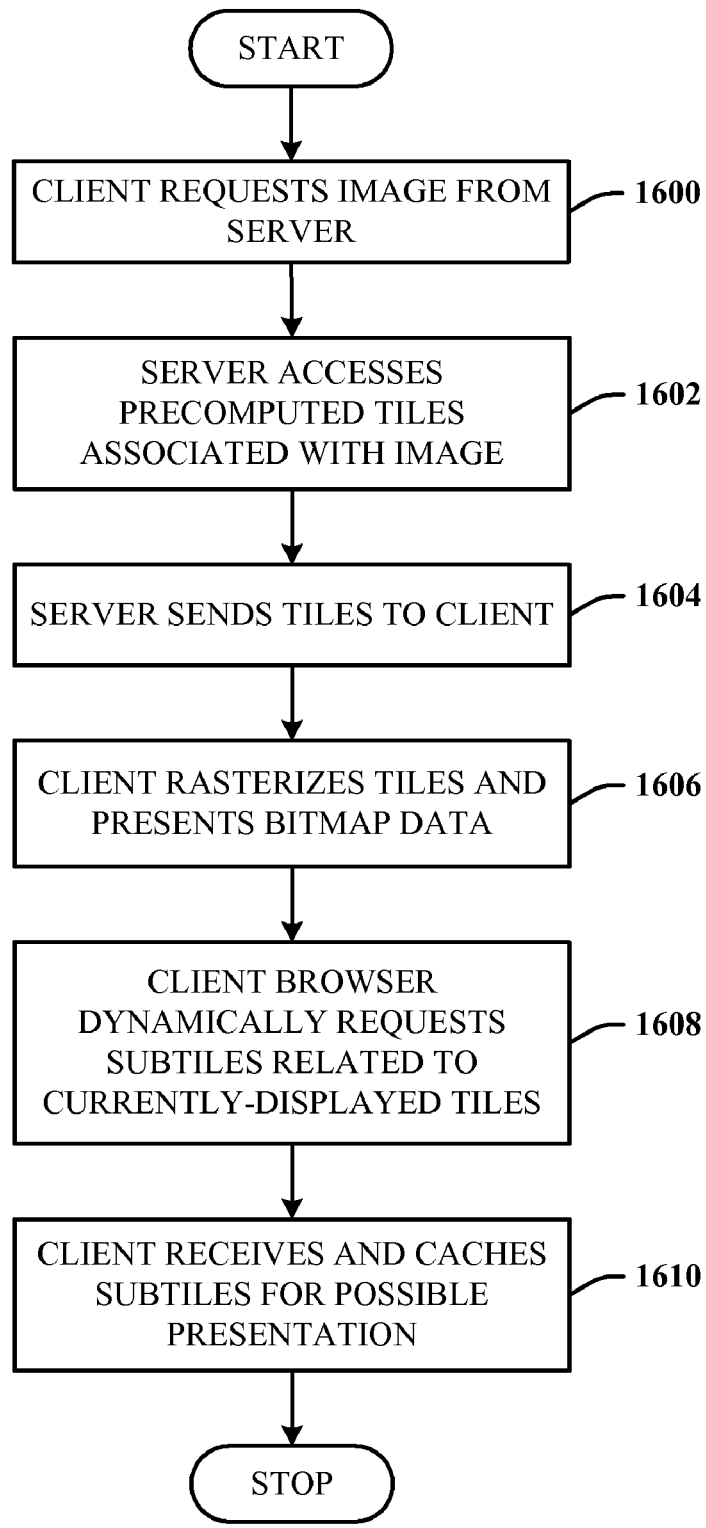
FIG. 16 illustrates a method of fetching tiles based on currently-displayed tiles.

FIG. 16 illustrates a method of fetching tiles based on currently-displayed tiles. At 1600, a request for an image for viewing is made from the client to the server. At 1602, the server accesses precomputed tiles associated with the image. At 1604, the server transmits the tiles to the client. At 1606, the client rasterizes the tiles and presents the bitmap data. At 1608, the client browser dynamically requests (fetches) sub-tiles related to the currently-display tiles, the subtiles having greater detail than the tile data. The dynamicism can be based on user interaction with the displayed tiles, and/or simply based on the previously-requested image tiles. At 1610, the client receives and caches the subtiles in preparation for possible presentation.

Figure 17:
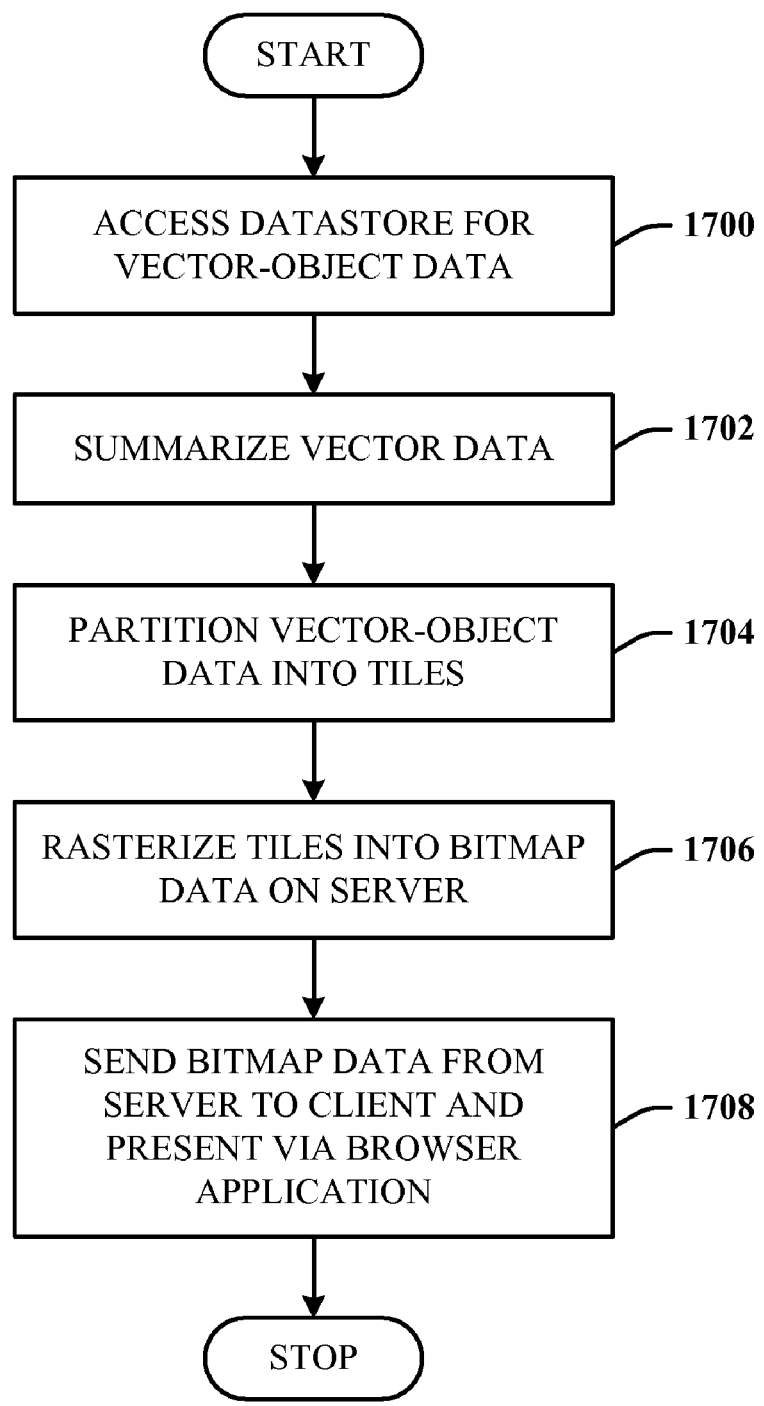
FIG. 17 illustrates a method of rasterizing tile data on a server.

FIG. 17 illustrates a method of rasterizing tile data on a server. At 1700, a datastore of vector data is accessed. At 1702, the server summarizes the data. At 1704, the server partitions the vector data in tiles. At 1706, the server rasterizes the tiles into bitmap data. At 1708, the server sends the bitmap data to the client for presentation to the client browser.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 18:
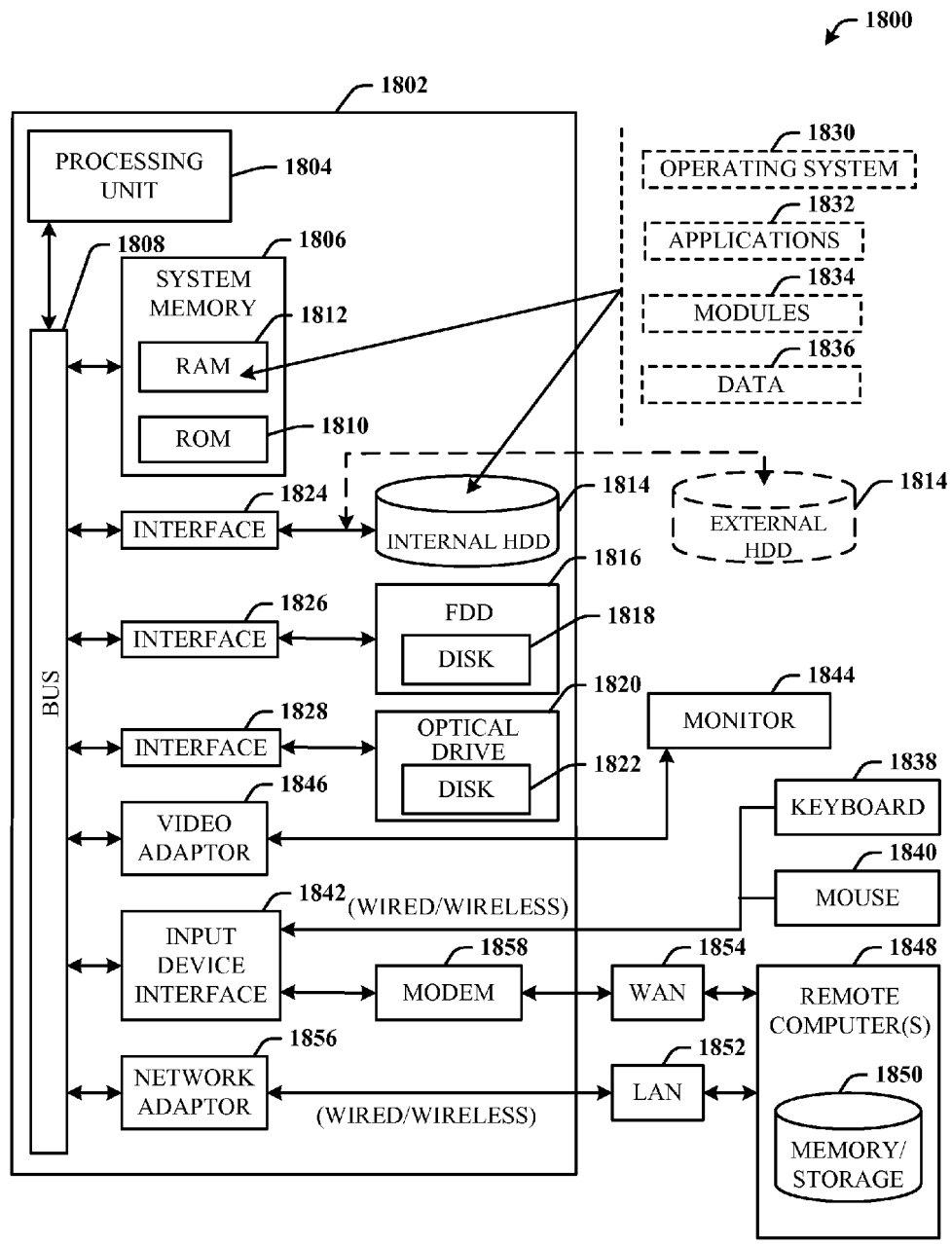
FIG. 18 illustrates a block diagram of a computing system operable to execute the disclosed tile packaging architecture.

Referring now to FIG. 18, there is illustrated a block diagram of a computing system 1800 operable to execute the disclosed tile packaging architecture. In order to provide additional context for various aspects thereof, FIG. 18 and the following discussion are intended to provide a brief, general description of a suitable computing system 1800 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 18, the exemplary computing system 1800 for implementing various aspects includes a computer 1802, the computer 1802 including a processing unit 1804, a system memory 1806 and a system bus 1808. The system bus 1808 provides an interface for system components including, but not limited to, the system memory 1806 to the processing unit 1804. The processing unit 1804 can be any of various commercially available processors. Dual microprocessors and other multi-processor architectures may also be employed as the processing unit 1804.

The system bus 1808 can be any of several types of bus structure that may further interconnect to a memory bus (with or without a memory controller), a peripheral bus, and a local bus using any of a variety of commercially available bus architectures. The system memory 1806 includes read-only memory (ROM) 1810 and random access memory (RAM) 1812. A basic input/output system (BIOS) is stored in a non-volatile memory 1810 such as ROM, EPROM, EEPROM, which BIOS contains the basic routines that help to transfer information between elements within the computer 1802, such as during start-up. The RAM 1812 can also include a high-speed RAM such as static RAM for caching data.

The computer 1802 further includes an internal hard disk drive (HDD) 1814 (e.g., EIDE, SATA), which internal hard disk drive 1814 may also be configured for external use in a suitable chassis (not shown), a magnetic floppy disk drive (FDD) 1816, (e.g., to read from or write to a removable diskette 1818) and an optical disk drive 1820, (e.g., reading a CD-ROM disk 1822 or, to read from or write to other high capacity optical media such as the DVD). The hard disk drive 1814, magnetic disk drive 1816 and optical disk drive 1820 can be connected to the system bus 1808 by a hard disk drive interface 1824, a magnetic disk drive interface 1826 and an optical drive interface 1828, respectively. The interface 1824 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 1812, including an operating system 1830, one or more application programs 1832, other program modules 1834 and program data 1836. As a client machine, the operating system 1830, one or more application programs 1832, other program modules 1834 and program data 1836 can include the conversion component 306, the browser application 208, the bitmap data 210, client 604 and image 606, for example. As a server machine, the operating system 1830, one or more application programs 1832, other program modules 1834 and program data 1836 can include the encoding component 102, conversion component 206, summarize component 404, vector datastore 402 and partition component 406, for example.

All or portions of the operating system, applications, modules, and/or data can also be cached in the RAM 1812. It is to be appreciated that the disclosed architecture can be implemented with various commercially available operating systems or combinations of operating systems.

A user can enter commands and information into the computer 1802 through one or more wire/wireless input devices, for example, a keyboard 1838 and a pointing device, such as a mouse 1840. Other input devices (not shown) may include a microphone, an IR remote control, a joystick, a game pad, a stylus pen, touch screen, or the like. These and other input devices are often connected to the processing unit 1804 through an input device interface 1842 that is coupled to the system bus 1808, but can be connected by other interfaces, such as a parallel port, an IEEE 1394 serial port, a game port, a USB port, an IR interface, etc.

A monitor 1844 or other type of display device is also connected to the system bus 1808 via an interface, such as a video adapter 1846. In addition to the monitor 1844, a computer typically includes other peripheral output devices (not shown), such as speakers, printers, etc.

The computer 1802 may operate in a networked environment using logical connections via wire and/or wireless communications to one or more remote computers, such as a remote computer(s) 1848. The remote computer(s) 1848 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory/storage device 1850 is illustrated. The logical connections depicted include wire/wireless connectivity to a local area network (LAN) 1852 and/or larger networks, for example, a wide area network (WAN) 1854. Such LAN and WAN networking environments are commonplace in offices and companies, and facilitate enterprise-wide computer networks, such as intranets, all of which may connect to a global communications network, for example, the Internet.

When used in a LAN networking environment, the computer 1802 is connected to the local network 1852 through a wire and/or wireless communication network interface or adapter 1856. The adaptor 1856 may facilitate wire or wireless communication to the LAN 1852, which may also include a wireless access point disposed thereon for communicating with the wireless adaptor 1856.

When used in a WAN networking environment, the computer 1802 can include a modem 1858, or is connected to a communications server on the WAN 1854, or has other means for establishing communications over the WAN 1854, such as by way of the Internet. The modem 1858, which can be internal or external and a wire and/or wireless device, is connected to the system bus 1808 via the serial port interface 1842. In a networked environment, program modules depicted relative to the computer 1802, or portions thereof, can be stored in the remote memory/storage device 1850. It will be appreciated that the network connections shown are exemplary and other means of establishing a communications link between the computers can be used.

The computer 1802 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 19:
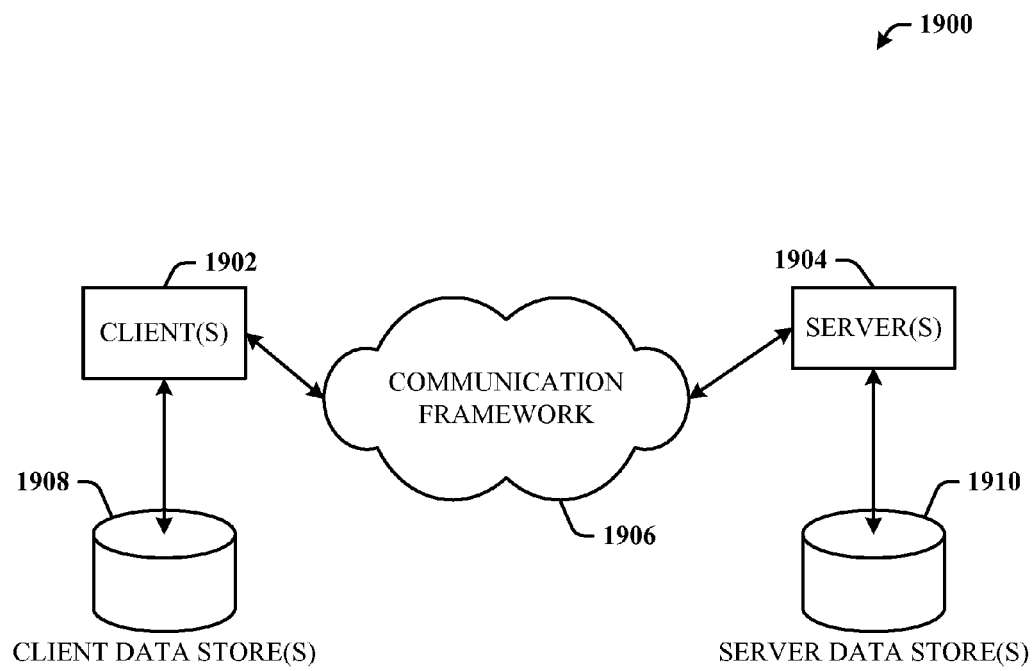
FIG. 19 illustrates a schematic block diagram of an exemplary computing environment for tile packaging of vector image data.

Referring now to FIG. 19, there is illustrated a schematic block diagram of an exemplary computing environment 1900 for tile packaging of vector image data. The system 1900 includes one or more client(s) 1902. The client(s) 1902 can be hardware and/or software (e.g., threads, processes, computing devices). The client(s) 1902 can house cookie(s) and/or associated contextual information, for example.

The system 1900 also includes one or more server(s) 1904. The server(s) 1904 can also be hardware and/or software (e.g., threads, processes, computing devices). The servers 1904 can house threads to perform transformations by employing the architecture, for example. One possible communication between a client 1902 and a server 1904 can be in the form of a data packet adapted to be transmitted between two or more computer processes. The data packet may include a cookie and/or associated contextual information, for example. The system 1900 includes a communication framework 1906 (e.g., a global communication network such as the Internet) that can be employed to facilitate communications between the client(s) 1902 and the server(s) 1904.

Communications can be facilitated via a wire (including optical fiber) and/or wireless technology. The client(s) 1902 are operatively connected to one or more client data store(s) 1908 that can be employed to store information local to the client(s) 1902 (e.g., cookie(s) and/or associated contextual information). Similarly, the server(s) 1904 are operatively connected to one or more server data store(s) 1910 that can be employed to store information local to the servers 1904.

The clients 1902 can include the client 204 and client 304, while the servers 1904 can include the server 202, server 302, and vector datastore 402, for example.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented image handling system, comprising:

an encoding component for encoding vector data into vector tiles having tile boundaries of a predetermined size, such that vector objects with extent are intersected within the tile boundaries so that each vector tile contains only vector data that belongs within the extents of the objects;

a conversion component for rasterizing the vector data of the vector tiles into bitmap data on at least one of a client or a server, and a processor that executes computer-executable instructions associated with at least one of the encoding component or the conversion component.

2. The system of claim 1, wherein the vector tiles are precomputed on the server.

3. The system of claim 1, wherein the vector tiles are cached.

4. The system of claim 1, wherein the vector tiles associated with the bitmap data is prefetched.

5. The system of claim 1, wherein per-tile metadata is provided with the bitmap data.

6. The system of claim 1, wherein the client dynamically fetches subtiles of the vector tiles based on currently-displayed tile data, the subtiles having greater detail than the tile data.

7. The system of claim 1, wherein the vector tiles are managed according to a content budget based on at least one of a count of pixels of an object representation or a count of bytes of the object representation.

8. The system of claim 1, wherein the vector tiles are transmitted from multiple disparate servers.

9. The system of claim 1, wherein the vector tiles are organized into a multi-resolution tile pyramid.

10. The system of claim 1, wherein the vector tiles conform to a format compatible with a cylindrical projection of a spherical body.

11. A computer-implemented method of handling image data, comprising acts of:

accessing a server datastore for an image in the form of vector-object data comprising vector objects having extent;

partitioning the vector-object data into vector tiles having tile boundaries;

transmitting the vector tiles to a client;

intersecting the vector objects within the tile boundaries so that each vector tile contains only vector data that belongs within the extents of the vector objects;

rasterizing the vector tiles into bitmap data on the client; and utilizing a processor that executes instructions stored in memory to perform at least one of the acts of accessing, partitioning, transmitting, intersecting, or rasterizing.

12. The method of claim 11, further comprising precomputing the vector tiles on a server.

13. The method of claim 11, further comprising caching the vector tiles.

14. The method of claim 11, further comprising generating and providing per-tile metadata with the bitmap data, the metadata and bitmap data presented via a browser application on the client for user interaction.

15. The method of claim 14, further comprising prefetching the vector tiles related to the bitmap data.

16. The method of claim 11, further comprising dynamically fetching subtiles of the vector tiles based on currently-displayed vector tiles, the subtiles having greater detail than the vector tiles.

17. The method of claim 11, further comprising establishing a budget for tiles of the vector objects based on at least one of pixel count or a byte count of a tile.

18. The method of claim 11, further comprising invoking summarization of the vector-object data prior to partitioning into vector tiles, both the summarization and the partitioning occurring on a server.

19. The method of claim 11, further comprising determining if to transmit rasterized vector-object data to the client based on quantity of the vector-object data.

20. A computer-implemented system, comprising:
- computer-implemented means for accessing a server datastore of vector-object data comprising vector objects having extent;
- computer-implemented means for partitioning the vector-object data into tiles having tile boundaries;
- computer-implemented means for intersecting the vector objects within the tile boundaries so that each vector tile contains only vector data that belongs within the extents of the vector objects;
- computer-implemented means for sending the tiles to a client;
- computer-implemented means for rasterizing the tiles into bitmap data on the client;
- computer-implemented means for presenting the bitmap data via a client browser application; and
- a computer-readable medium on which resides at least one of the computer-implemented means for accessing, partitioning, intersecting, sending, rasterizing, or presenting.

* * * * *